United States Patent
Tang et al.

(10) Patent No.: US 12,403,952 B2
(45) Date of Patent: Sep. 2, 2025

(54) CONTROL DEVICE AND CONTROL METHOD FOR STEER BY WIRE

(71) Applicant: Hitachi Astemo, Ltd., Hitachinaka (JP)

(72) Inventors: Chung Kim Tang, Tokyo (JP); Kenta Maeda, Tokyo (JP); Huajun Liu, Hitachinaka (JP); Atsushi Hirata, Hitachinaka (JP); Yasuhito Nakakuki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 77 days.

(21) Appl. No.: 18/569,385

(22) PCT Filed: May 10, 2022

(86) PCT No.: PCT/JP2022/019774
§ 371 (c)(1),
(2) Date: Dec. 12, 2023

(87) PCT Pub. No.: WO2022/270164
PCT Pub. Date: Dec. 29, 2022

(65) Prior Publication Data
US 2024/0262417 A1    Aug. 8, 2024

(30) Foreign Application Priority Data
Jun. 24, 2021   (JP) .................. 2021-104727

(51) Int. Cl.
*B62D 6/00*   (2006.01)
(52) U.S. Cl.
CPC .................... *B62D 6/008* (2013.01)
(58) Field of Classification Search
CPC .......... B62D 6/008; B62D 6/007; B62D 6/00; B62D 5/04; B62D 101/00; B62D 117/00
See application file for complete search history.

(56) References Cited

U.S. PATENT DOCUMENTS

| 2019/0351936 A1 | 11/2019 | Anraku et al. |
| 2020/0023894 A1 | 1/2020 | Naik et al. |
| 2022/0185367 A1 | 6/2022 | Namikawa et al. |

FOREIGN PATENT DOCUMENTS

| CN | 113232722 A | 8/2021 |
| JP | 2014-058225 A | 4/2014 |

(Continued)

OTHER PUBLICATIONS

International Search Report, PCT/JP2022/019774, Jul. 26, 2022, 2 pgs.

*Primary Examiner* — Lindsay M Low
*Assistant Examiner* — Charles J Brauch
(74) *Attorney, Agent, or Firm* — Volpe Koenig

(57) ABSTRACT

A control device method for steer by wire, the control device including a first motor controlling steering via an FBA and a second motor controlling a steering angle of a wheel via an RWA and being capable of bidirectionally controlling the first motor and the second motor includes a base SAT that obtains a reference torque based on an angle of the first motor and a vehicle speed, and a rack force estimation portion that estimates rack force as a reaction force based on a steering angle of a wheel and an RWA. A first control mode controls a reference torque of the first motor and a second control mode controls the first motor based on a reaction force estimation by the rack force estimation portion, the first and second control modes are switched based on output of the base SAT and output of the rack force estimation portion.

12 Claims, 7 Drawing Sheets

(56) References Cited

FOREIGN PATENT DOCUMENTS

| | | | |
|---|---|---|---|
| JP | 2019-199172 | A | 11/2019 |
| JP | 2020-185918 | A | 11/2020 |
| JP | 2022-094175 | A | 6/2022 |

CONTROL DEVICE AND CONTROL METHOD FOR STEER BY WIRE

TECHNICAL FIELD

The present invention relates to a control device for a steering system, and more particularly to a control device and a control method for steer by wire.

BACKGROUND ART

Conventionally, in a steering system, a steering rack and a steering wheel are connected to a machine. In this system, a reaction force generated in a tire due to an interaction with a road surface is transmitted to a driver as a reaction force on a steering wheel via a mechanical connection. This reaction force is essential for a driver to safely control a vehicle in all road conditions.

Examples of the reaction force include a self-aligning torque (SAT) and disturbance to steering caused by an obstacle.

Steer by wire (SBW: Steer by wire, hereinafter referred to as SBW) is a system that does not have a mechanical connection between a steering wheel and a steering rack and the mechanical connection is substituted by communication and an actuator. Therefore, since a reaction force generated in a tire cannot be mechanically transmitted to a driver, it is necessary to simulate a steering system behavior equivalent to a conventional one during a manual driving mode. A feedback actuator (FBA, hereinafter referred to as FBA) which is an actuator installed in a steering wheel plays a role of giving a simulated reaction force to a driver. A road wheel actuator (RWA, hereinafter referred to as RWA), which is an actuator connected to a steering rack, provides a force for moving the steering rack to the left and right to a steering road wheel. The FBA and the RWA are controlled by an electronic control unit (ECU, hereinafter referred to as ECU) which is an embedded computer.

As a technique related to such SBW, for example, a technique described in PTL 1 is known. PTL 1 discloses that a feedback torque of a steering wheel is calculated based on deviation between a steering torque applied to a steering rack and a steering torque less than a minimum torque.

CITATION LIST

Patent Literature

PTL 1: US 2020/0023894 A

SUMMARY OF INVENTION

Technical Problem

However, current SBW and the technique disclosed in PTL 1 mainly focus on reproducing a conventional steering system. A reaction force including noise from a road surface is always fed back to a driver, and there is a risk that an uncomfortable steering feeling may be caused.

Therefore, the present invention provides a control device and a control method for steer by wire capable of realizing both comfort and safety.

Solution to Problem

In order to solve the above problem, a control device for steer by wire according to the present invention is a control device for steer by wire including a first motor that controls steering via a feedback actuator and a second motor that controls a steering angle of a wheel via a road wheel actuator, and being capable of bidirectionally controlling the first motor and the second motor. The control device for steer by wire includes a base SAT torque portion that obtains a simulated feedback actuator torque based on an angle of the first motor and a vehicle speed, and a rack force estimation portion that estimates a rack force as a reaction force based on a steering angle of the wheel and a road wheel actuator. A first control mode for controlling a simulated feedback actuator torque of the first motor and a second control mode for controlling the first motor based on a reaction force estimated by the rack force estimation portion are included, and the first control mode and the second control mode are switched based on output of the base SAT portion and output of the rack force estimation portion.

Further, a control method for steer by wire according to the present invention is a control method for steer by wire including a first motor that controls steering via a feedback actuator and a second motor that controls a steering angle of a wheel via a road wheel actuator, and being capable of bidirectionally controlling the first motor and the second motor. The control method for steer by wire includes obtaining, by a base SAT portion, a simulated feedback actuator torque based on an angle of the first motor and a vehicle speed, estimating, by a rack force estimation portion, a rack force as a reaction force based on a steering angle of the wheel and a road wheel actuator, and switching, based on output of the base SAT portion and output of the rack force estimation portion, between a first control mode for controlling a simulated feedback actuator torque of the first motor and a second control mode for controlling the first motor based on a reaction force estimated by the rack force estimation portion.

Advantageous Effects of Invention

According to the present invention, it is possible to provide a control device and a control method for steer by wire capable of realizing both comfort and safety.

Specifically, a base SAT is calculated in a simulated feedback mode to provide comfortable steering and filter all unnecessary noise from a road surface. A bilateral control (bilateral control component: BLC, hereinafter referred to as BLC) mode provides road tactile feedback to alert a driver when needed (for example, if an RWA cannot perform steering further due to the presence of an obstacle, a strong reaction force is generated on an FBA).

An object, a configuration, and an advantageous effect other than those described above will be clarified in description of an embodiment described below.

DESCRIPTION OF EMBODIMENTS

First, an SBW system to which a control device for steer by wire according to the present invention is applied will be described.

Figure 1:
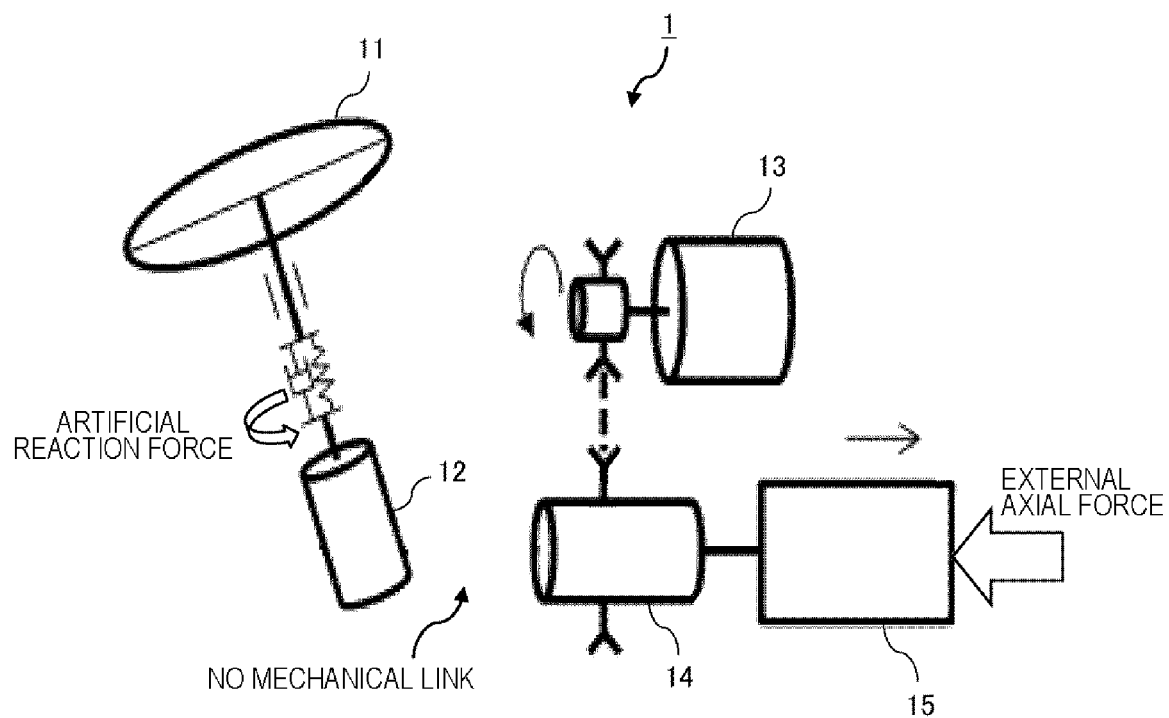
FIG. 1 is an overall schematic configuration diagram of an SBW system to which a control device according to the present invention is applied.

FIG. 1 is an overall schematic configuration diagram of an SBW system to which the control device according to the present invention is applied. As illustrated in FIG. 1, the SBW system includes a steering wheel 11 (hereinafter, may be referred to as steering), an FBA motor (first motor) 12, an RWA motor (second motor) 13, a ball screw 14, and a rack 15.

The steering wheel 11 is a handle that can be held by a driver, and a driver can input a steering command (steering torque) to command an angle of a rack. A mechanical link is removed in an SBW system (no mechanical link), while in a conventional steering system, there is a mechanical link between a steering wheel and a steering rack. A simulated reaction force is a force applied to a driver via the steering wheel 11 in order to reproduce a sense of resistance force when a conventional steering system is steered. The rack 15 is a mechanical connection portion for steering a road wheel (wheel). An external axial force is a force introduced into the rack 15 from an external environment. The FBA (first motor) 12 is a motor attached to the steering wheel 11, and has a role of applying a simulated reaction force to a driver. The RWA motor (second motor) 13 is a motor used to steer the rack 15 according to a command received from an FBA. The ball screw 14 is a connecting portion that converts a rotational motion of an RWA into a linear motion of the rack 15.

Hereinafter, an embodiment of a control device for steer by wire according to the present invention applied to the above-described SBW system will be described with reference to the drawings.

First Embodiment

Figure 2:
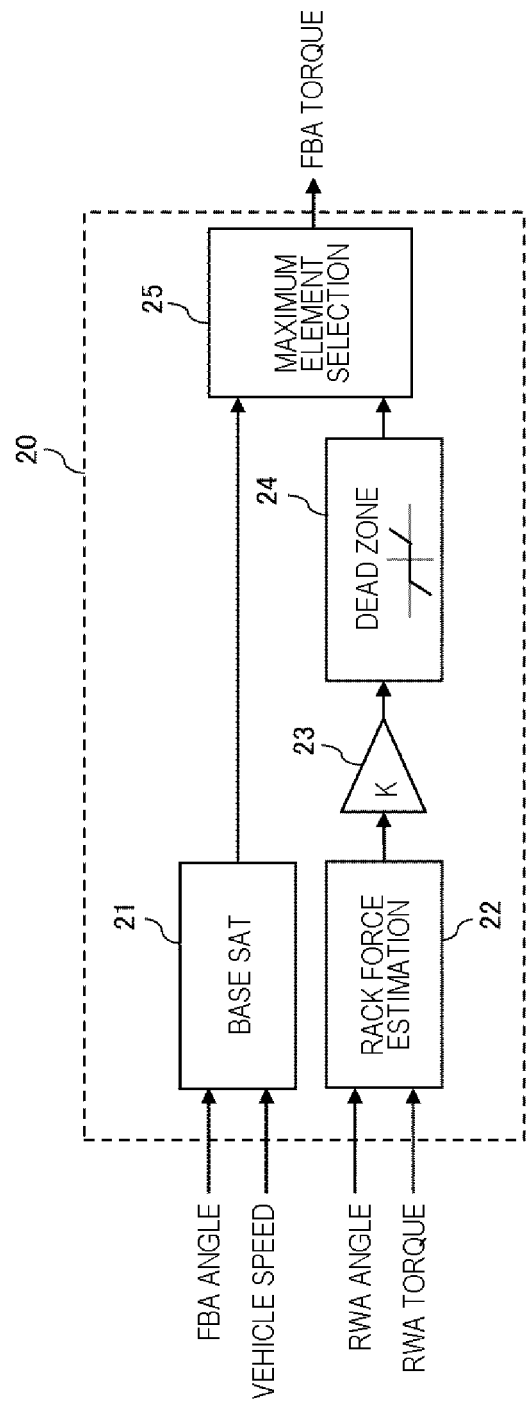
FIG. 2 is a block diagram of a control device of a first embodiment according to an embodiment of the present invention.

FIG. 2 is a block diagram of a control device of a first embodiment according to an embodiment of the present invention. As illustrated in FIG. 2, a control device 20 for steer by wire includes a block of a base SAT 21, a block of rack force estimation 22, a block of gain K 23, a block of dead zone 24, and a block of maximum element selection 25. Here, the control device 20 for steer by wire is mounted on an ECU, and a block of the base SAT 21, a block of the rack force estimation 22, a block of the gain K 23, a block of the dead zone 24, and a block of the maximum element selection 25 are realized by, for example, a processor such as a CPU (not illustrated), a ROM that stores various programs, a RAM that temporarily enables data of a calculation process, and a storage device such as an external storage device. A processor such as a CPU reads and executes various programs stored in a ROM, and stores a calculation result which is an execution result in a RAM or an external storage device. Note that the control device 20 for steer by wire is not limited to be mounted on an ECU, and may be configured to be mounted on another electronic control system.

An FBA angle is an angle of the steering wheel 11 or a motor (the FBA motor (first motor) 12) attached to the steering wheel 11. A vehicle speed is a speed at which a vehicle is moving with respect to the ground. A block of the base SAT 21 receives an FBA angle and a vehicle speed, and outputs, to a block of the maximum element selection 25, an FBA torque that simulates torque transmitted to a steering wheel by self-aligning torque (SAT) generated by a rotating road wheel (wheel).

An RWA angle is an angle of the rack 15, a road wheel (wheel), or the RWA motor (second motor) 13 attached to a road wheel (wheel). RWA torque is torque generated by the RWA motor (second motor) 13 attached to a road wheel (wheel) or the rack 15. A block of the rack force estimation 22 is an algorithm for estimating a direction and magnitude of a force in the rack 15, receives input of an RWA angle and an RWA torque, and outputs an estimated rack force to a block of the gain K 23.

A block of the gain K 23 is a gain for converting an estimated rack force input from a block of the rack force estimation 22 into a torque converted into an FBA axis and comparing the torque with a block of the base SAT 21. A block of the dead zone 24 is a function having a function of removing noise in an estimated rack force input from a block of the rack force estimation 22 and generating zero output in a designated region.

A block of the maximum element selection 25 is a function that outputs a maximum element of input that is either a reference torque that is a value obtained by converting a simulated SAT input from a block of the base SAT 21 into an FBA torque or a converted estimated rack force. An FBA torque is output of a block of the maximum element selection 25 and is a torque applied to an FBA and the steering wheel 11.

Figure 3:
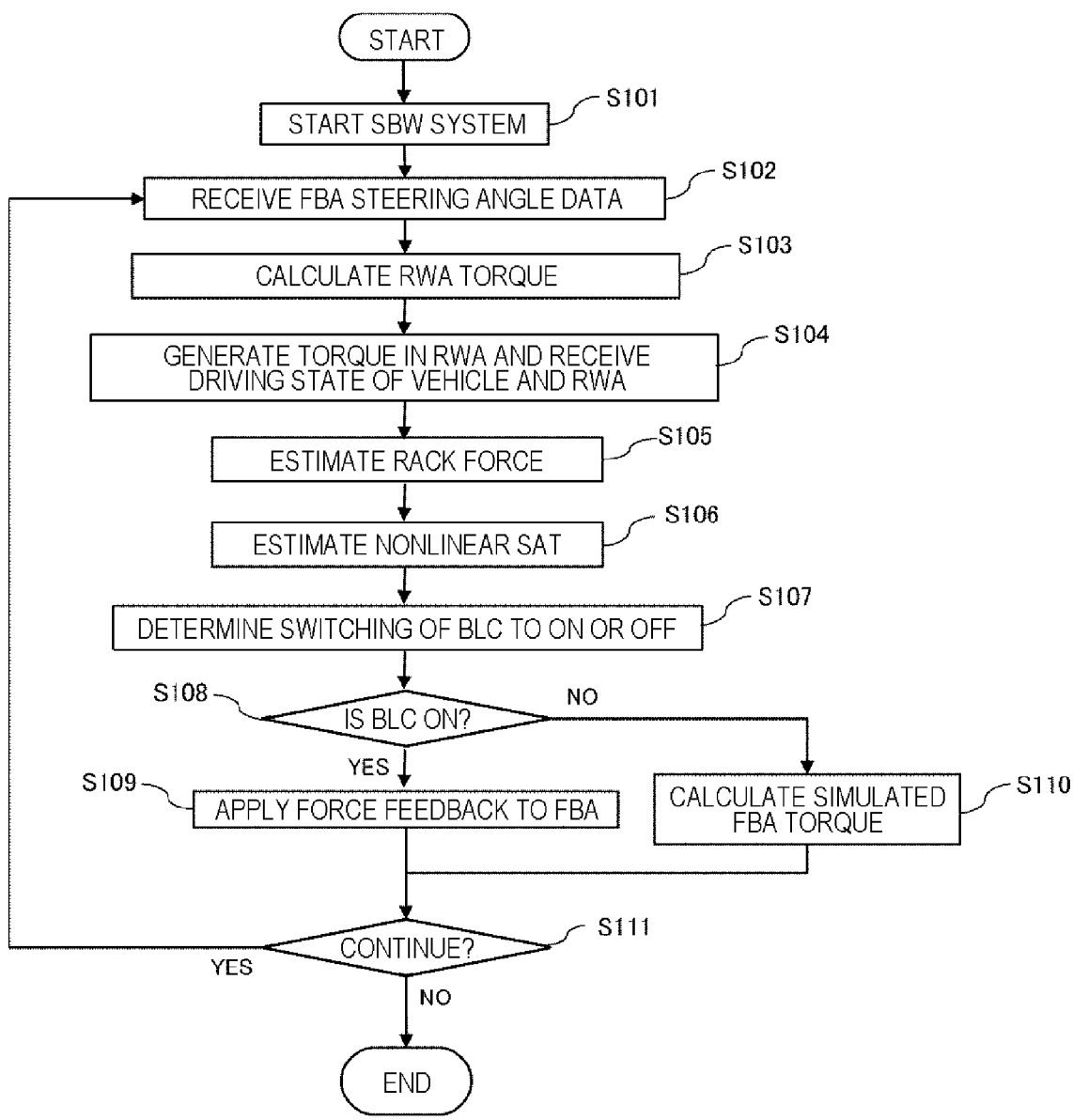
FIG. 3 is a flowchart of an SBW system to which the control device according to the first embodiment is applied.

FIG. 3 is a flowchart of an SBW system to which the control device 20 for steer by wire according to the present embodiment is applied.

As an ignition of a vehicle is turned ON, a process illustrated in FIG. 3 starts. In Step S101, an SBW system is activated. For example, a current FBA angle and an RWA angle are checked, and an FBA angle and an RWA angle are matched.

In Step S102, SBW starts to operate, an angle (steering angle) of the steering wheel 11 (see FIG. 1) is detected, and is converted into a command to an RWA as a steering angle command. In other words, an FBA angle that is an angle of the steering wheel 11 or a motor (the FBA motor (first motor) 12) attached to the steering wheel 11 is detected (FBA steering angle data is received), and an angle command is output from an FBA to an RWA.

In Step S103, an RWA torque necessary for following the angle command from the FBA is calculated.

In Step S104, the torque calculated in Step S103 is generated in the RWA, and a driving state of the vehicle and the RWA are received. That is, the driving state of the vehicle and the RWA are monitored. In Step S105, a block of the rack force estimation 22 (see FIG. 2) constituting the control device 20 for steer by wire estimates an external axial force introduced into the rack 15 (see FIG. 1), and converts the estimated rack force into an FBA torque. Further, in Step S106, a block of the base SAT 21 (see FIG. 2) calculates an FBA torque (reference torque) simulating a reaction torque by SAT by using the FBA angle and a vehicle speed.

In Step S107, the converted estimated rack force is compared with a reference torque generated by a block of the base SAT 21, and a BLC is determined to be switched to ON or OFF. Here, the BLC is assumed to be, for example, a case where a master is an FBA and a slave is an RWA. A steering angle (FBA angle) which is an angle of the steering wheel 11 received from a master-side FBA is transmitted as an angle command to an RWA which is the slave side. In a case where the RWA on the slave side operates in accordance with the received angle command and a road wheel (wheel) comes into contact with an obstacle, the RWA on the slave side feeds back a detected force (tactile force) to the FBA on the master side. The FBA on the master side transmits a tactile force to a driver via the steering wheel 11. The bidirectional control performed between a master and a slave in this manner is a bilateral control component (BLC).

In Step S108, it is determined whether the BLC is ON or OFF. In Step S109, in a case where the BLC is ON, a converted estimated reaction force is output to the FBA, and a road surface tactile feedback is transmitted to the driver via the steering wheel 11. On the other hand, in Step S110, in a case where the BLC is OFF, a reference torque generated by the FBA calculated in a block of the base SAT 21 is calculated, the calculated reference torque is generated by the FBA, and a smooth and comfortable steering reaction force is provided to the driver.

In Step S111, whether or not an ignition of the vehicle is still ON is checked. That is, whether or not the processing from Step S102 to Step S110 described above is continued is checked. In a case where the ignition of the vehicle is still ON, the processing returns to Step S102 and the above-described processing from Step S102 to Step S110 is executed. On the other hand, when the ignition of the vehicle is OFF, the processing ends.

Figure 4:
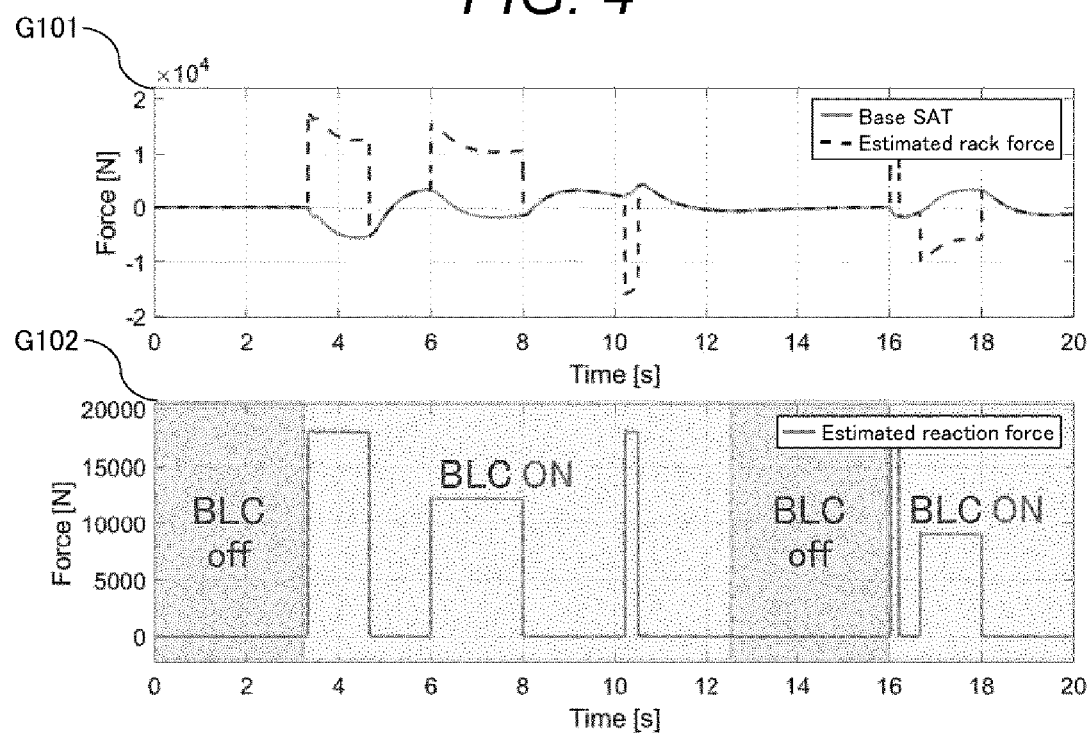
FIG. 4 is a timing chart showing an ON/OFF timing of a BLC.

FIG. 4 is a timing chart illustrating an ON/OFF timing of a BLC. In FIG. 4, G101 is an example of a time series for comparing output (reference torque) from a block of the base SAT 21 (see FIG. 2) with an estimated rack force which is output from a block of the rack force estimation 22 (see FIG. 2). The horizontal axis represents time, the vertical axis represents force, a solid line represents output (reference torque) from a block of the base SAT 21, and a broken line represents an estimated rack force which is output from a block of the rack force estimation 22. G102 is a time series indicating a switching timing of a BLC when a time series for comparing output (reference torque) from a block of the base SAT 21 with an estimated rack force which is output from a block of the rack force estimation 22 is G101. A block of the maximum element selection 25 (see FIG. 2) illustrated in FIG. 2 compares output (reference torque) from a block of the base SAT 21 with an estimated rack force, which is output from a block of the rack force estimation 22, and outputs either one of them which is a maximum value as an FBA torque, and when the estimated rack force exceeds output (reference torque) from a block of the base SAT 21, a BLC is turned on.

Figure 5:
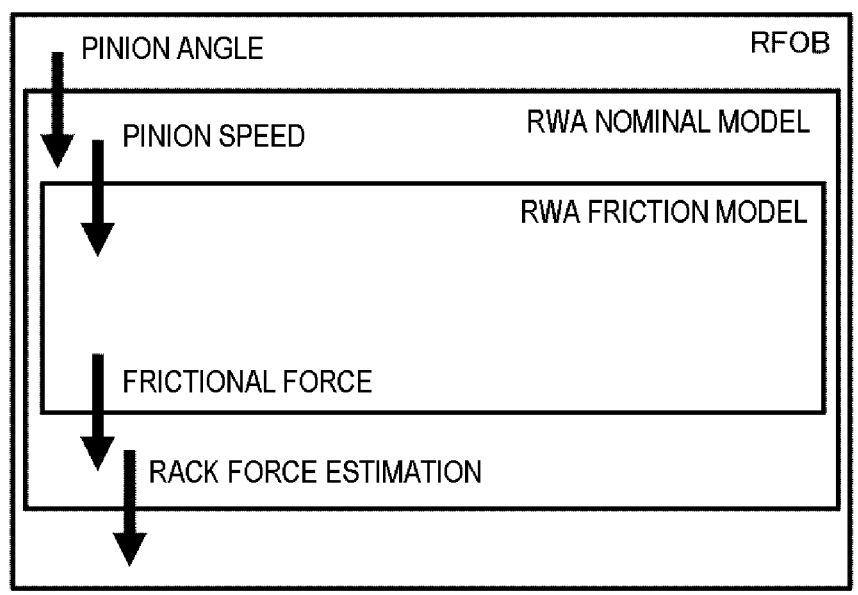
FIG. 5 is a diagram illustrating a relationship between a reaction force observer and a friction model.

FIG. 5 is a diagram illustrating a relationship between a reaction force observer and a friction model. In FIG. 5, a reaction force observer RFOB uses an algorithm for estimating a rack force without using a force sensor. A pinion angle is an angle of the steering wheel 11 or a converted RWA angle of the steering wheel 11. A pinion speed is a ratio of rotation of a steering angle. A frictional force is a resistance force generated by an object that is in contact during motion within an RWA. An RWA nominal model is a model that counts backward a force acting on the rack 15 (see FIG. 1) by using a pinion angle. An RWA friction model is a model in a nominal model for calculating a frictional force that improves estimation accuracy of a rack force.

As described above, according to the present embodiment, it is possible to provide a control device for steer by wire capable of realizing both comfort and safety.

Second Embodiment

Figure 6:
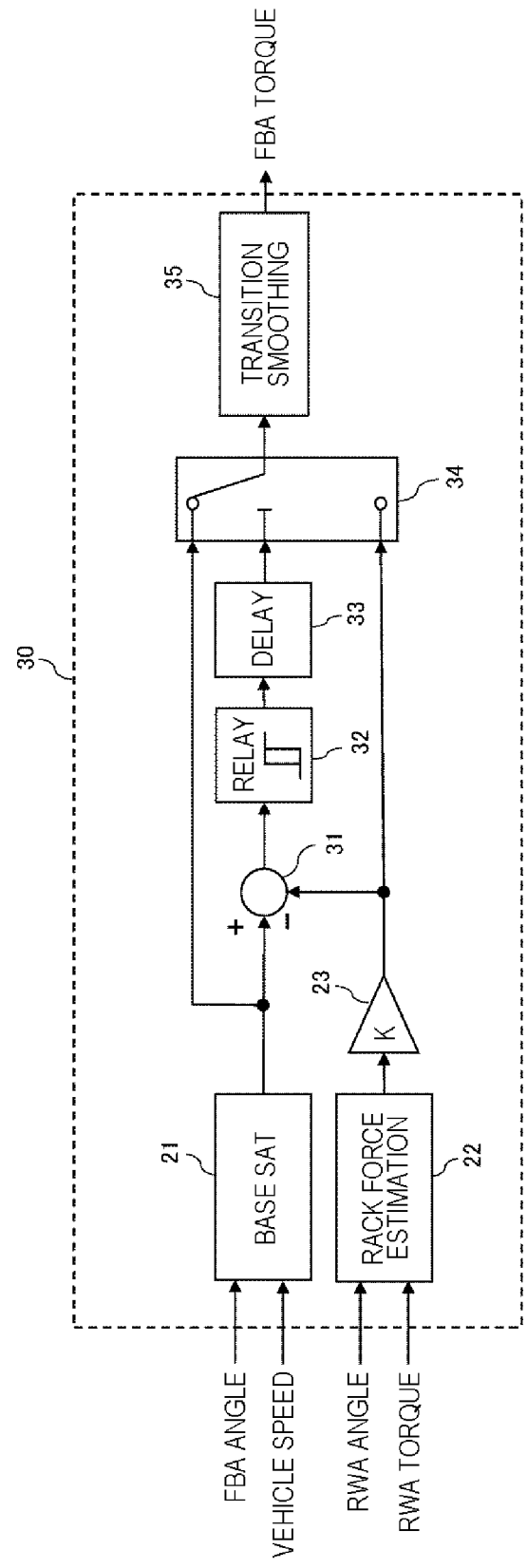
FIG. 6 is a block diagram of the control device of a second embodiment according to another embodiment of the present invention.

FIG. 6 is a block diagram of a control device of a second embodiment according to another embodiment of the present invention. The present embodiment is different from the first embodiment in that the control device 30 for steer by wire includes a block of deviation calculation 31, a block of relay 22, a block of delay 23, a block of a switch 34, and a block of transition smoothing 35 instead of a block of the dead zone 24 and a block of the maximum element selection 25. The same constituents as those of the first embodiment are denoted by the same reference numerals, and description overlapping the first embodiment will be omitted.

As illustrated in FIG. 6, the control device 30 for steer by wire according to the present embodiment includes a block of the base SAT 21, a block of the rack force estimation 22, a block of the gain K 23, a block of the deviation calculation 31, a block of the relay 22, a block of the delay 23, a block of the switch 34, and a block of the transition smoothing 35. Here, the control device 30 for steer by wire is mounted on an ECU, and a block of the base SAT 21, a block of the rack force estimation 22, a block of the gain K 23, a block of the deviation calculation 31, a block of the relay 22, a block of the delay 23, a block of the switch 34, and a block of the transition smoothing 35 are realized by, for example, a processor such as a CPU (not illustrated), a ROM that stores various programs, a RAM that temporarily enables data in a calculation process, and a storage device such as an external storage device. A processor such as a CPU reads and executes various programs stored in a ROM, and stores a calculation result which is an execution result in a RAM or an external storage device. Note that the control device 30 for steer by wire is not limited to be mounted on an ECU, and may be configured to be mounted on another electronic control system. Further, a block of the deviation calculation 31, a block of the relay 22, a block of the delay 23, and a block of the switch 34 may be realized by hardware.

A block of the deviation calculation 31 is a subtraction block for comparing or extracting a difference between output from a block of the base SAT 21 and output from a block of the rack force estimation 22. A block of the relay 22 is a hunting prevention mechanism for avoiding unnecessary switching between a block of the base SAT 21 and a block of the rack force estimation 22. A block of the delay 23 has a function of continuing to select a BLC mode even when an external force is no longer introduced into the rack 15 (see FIG. 1). A block of the switch 34 has a function of selecting any one of output from a block of the base SAT 21 (a reference torque generated by an FBA), output from a block of the rack force estimation 22 (a value obtained by converting an estimated rack force into a torque for an FBA), and output (a signal) from a block of the delay 23 and outputting the selected output to a block of the transition smoothing 35. A block of the transition smoothing 35 has a function of reducing a sharp value change (a steep value change) when an FBA torque is switched from a block of the rack force estimation 22 to a block of the base SAT 21, and avoiding confusion of a driver.

According to the present embodiment, in addition to the effect of the first embodiment, it is possible to more smoothly make a transition from a BLC mode to a base SAT mode.

Third Embodiment

Figure 7:
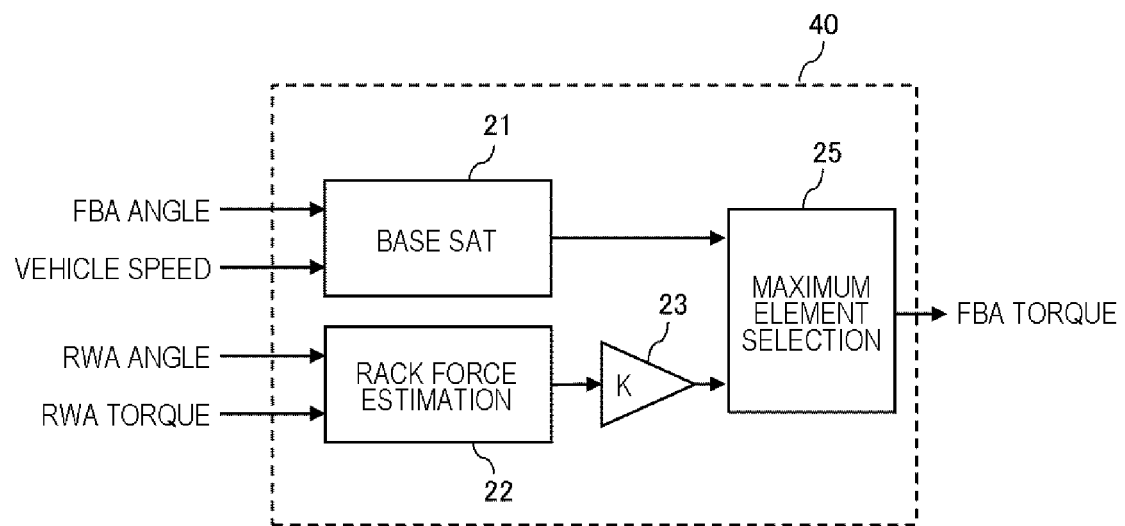
FIG. 7 is a block diagram of the control device of a third embodiment according to another embodiment of the present invention.

FIG. 7 is a block diagram of a control device of a third embodiment according to another embodiment of the present invention. The present embodiment is different from the first embodiment in that a control device 40 for steer by wire does not include a block of the dead zone 24. The same constituents as those of the first embodiment are denoted by the same reference numerals, and description overlapping the first embodiment will be omitted.

As illustrated in FIG. 7, the control device 30 for steer by wire according to the present embodiment includes a block of the base SAT 21, a block of the rack force estimation 22, a block of the gain K 23, and a block of the maximum element selection 25. Here, the control device 40 for steer by wire is mounted on an ECU, and a block of the base SAT 21, a block of the rack force estimation 22, a block of the gain K 23, and a block of the maximum element selection 25 are realized by, for example, a processor such as a CPU (not illustrated), a ROM that stores various programs, a RAM that temporarily enables data of a calculation process, and a storage device such as an external storage device. A processor such as a CPU reads and executes various programs stored in a ROM, and stores a calculation result which is an execution result in a RAM or an external storage device. Note that the control device 40 for steer by wire is not limited to be mounted on an ECU, and may be configured to be mounted on another electronic control system.

The present embodiment is more effective than the first embodiment and can simplify a configuration of the control device 40 for steer by wire.

Fourth Embodiment

Figure 8:
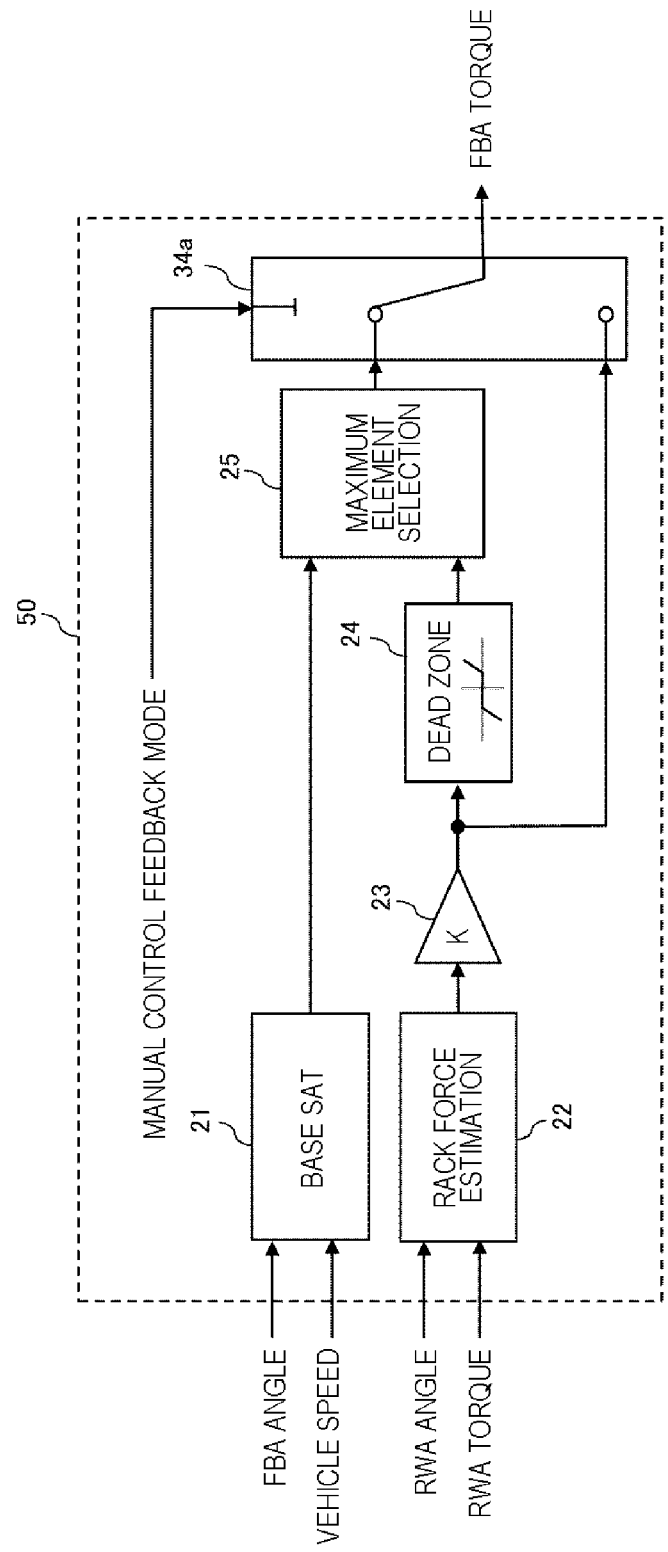
FIG. 8 is a block diagram of the control device of a fourth embodiment according to another embodiment of the present invention.

FIG. 8 is a block diagram of a control device of a fourth embodiment according to another embodiment of the present invention. The present embodiment is different from the first embodiment in that a control device 50 for steer by wire includes a block of a switch 34a, and a block of the switch 34a inputs setting of a manual control feedback mode, output from a block of the maximum element selection 25, and output from a block of the rack force estimation 22 (a value obtained by converting an estimated rack force into a torque for an FBA), and selects and outputs any one of them. The same constituents as those of the first embodiment are denoted by the same reference numerals, and description overlapping the first embodiment will be omitted.

As illustrated in FIG. 8, the control device 50 for steer by wire according to the present embodiment includes a block of the base SAT 21, a block of the rack force estimation 22, a block of the gain K 23, a block of the dead zone 24, a block of the maximum element selection 25, and a block of the switch 34a. Here, the control device 20 for steer by wire is mounted on an ECU, and a block of the base SAT 21, a block of the rack force estimation 22, a block of the gain K 23, a block of the dead zone 24, a block of the maximum element selection 25, and a block of the switch 34a are realized by, for example, a processor such as a CPU (not illustrated), a ROM that stores various programs, a RAM that temporarily enables data of a calculation process, and a storage device such as an external storage device. A processor such as a CPU reads and executes various programs stored in a ROM, and stores a calculation result which is an execution result in a RAM or an external storage device. Note that the control device 50 for steer by wire is not limited to be mounted on an ECU, and may be configured to be mounted on another electronic control system. Further, the block of the switch 34a may be realized by hardware.

Setting of a manual control feedback mode that may be input to a block of the switch 34a constituting the control device 50 for steer by wire according to the present embodiment includes whether a driver selects FBA torque feedback or an active BLC is selected so that rack force estimation feedback is performed all the time.

The control device 50 for steer by wire according to the present embodiment is not limited to the configuration illustrated in FIG. 8. For example, instead of a block of the dead zone 24 and a block of the maximum element selection 25 illustrated in FIG. 8, a block of the deviation calculation 31, a block of the relay 22, a block of the delay 23, a block of the switch 34, and a block of the transition smoothing 35 described in the second embodiment may be included. Furthermore, the configuration may be such that a block of the dead zone 24 illustrated in FIG. 8 is not included.

According to the present embodiment, in addition to the effects of the first to third embodiments described above, even in a case where a driver feels that comfort is impaired by selection of a BLC performed automatically, it is possible to switch to a manual control feedback mode to obtain comfort.

Note that a configuration referred to as a "block" in the first to fourth embodiments may be referred to as a "portion". Specifically, for example, a "block of the base SAT 21" may be referred to as the "base SAT portion 21", and a "block of the rack force estimation 22" may be referred to as the "rack force estimation portion 22", and the same applies to the other constituents.

Further, the present invention is not limited to the above embodiment and includes a variety of variations. For example, the above embodiment is described in detail for easy understanding of the present invention, and the present invention is not necessarily limited to one that includes the entirety of the described configurations. Further, a part of a configuration of a certain embodiment can be replaced with a configuration of another embodiment, and a configuration of a certain embodiment can also be added to a configuration of another embodiment.

REFERENCE SIGNS LIST

1 steer by wire system
11 steering wheel
12 FBA motor (first motor)
13 RWA motor (second motor)
14 ball screw
15 rack
20, 30, 40, 50 control device
21 base SAT
22 rack force estimation
23 gain K
24 dead zone
25 maximum element selection
31 deviation calculation
32 relay
33 delay
34, 34a switch
35 transition smoothing

The invention claimed is:

1. A control device for steer by wire including a first motor that controls steering via a feedback actuator and a second motor that controls a steering angle of a wheel via a road wheel actuator, and being capable of bidirectionally controlling the first motor and the second motor, the control device for steer by wire comprising:
- a base SAT portion that obtains a simulated feedback actuator torque based on an angle of the first motor and a vehicle speed; and
- a rack force estimation portion that estimates a rack force as a reaction force based on a steering angle of the wheel and a road wheel actuator,
- wherein a first control mode for controlling a simulated feedback actuator torque of the first motor and a second control mode for controlling the first motor based on a reaction force estimated by the rack force estimation portion are included, and
- the first control mode and the second control mode are switched based on output of the base SAT portion and output of the rack force estimation portion.

2. The control device for steer by wire according to claim 1, further comprising a maximum element selection portion that compares a simulated feedback actuator torque obtained by the base SAT portion with an estimated rack force estimated by the rack force estimation portion, and selects and outputs maximum output as a feedback actuator torque.

3. The control device for steer by wire according to claim 2, further comprising a dead zone portion that removes noise included in an estimated rack force estimated by the rack force estimation portion.

4. The control device for steer by wire according to claim 1, further comprising:
- a subtraction portion that subtracts an estimated rack force estimated by the rack force estimation portion from a simulated feedback actuator torque obtained by the base SAT portion; and
- a switch portion that selects any one of output of the subtraction portion, an estimated rack force estimated by the rack force estimation portion, and a simulated feedback actuator torque obtained by the base SAT portion,
- wherein a feedback actuator torque is determined based on output of the switch portion.

5. The control device for steer by wire according to claim 4, further comprising a transition smoothing portion capable of reducing a steep change in value that occurs when the feedback actuator torque is switched from an estimated rack force estimated by the rack force estimation portion to a simulated feedback actuator torque obtained by the base SAT portion.

6. The control device for steer by wire according to claim 1, further comprising a switch portion that selects any one of an estimated rack force estimated by the rack force estimation portion, a simulated feedback actuator torque obtained by the base SAT portion, and setting of a manual control feedback mode,
- wherein setting of a manual control feedback mode uses an estimated rack force estimated by the rack force estimation portion or a simulated feedback actuator torque obtained by the base SAT portion as a feedback actuator torque.

7. A control method for steer by wire including a first motor that controls steering via a feedback actuator and a second motor that controls a steering angle of a wheel via a road wheel actuator, and being capable of bidirectionally controlling the first motor and the second motor, the control method for steer by wire comprising:
- obtaining, by a base SAT portion, a simulated feedback actuator torque based on an angle of the first motor and a vehicle speed;
- estimating, by a rack force estimation portion, a rack force as a reaction force based on a steering angle of the wheel and a road wheel actuator; and
- switching, based on output of the base SAT portion and output of the rack force estimation portion, between a first control mode for controlling a simulated feedback actuator torque of the first motor and a second control mode for controlling the first motor based on a reaction force estimated by the rack force estimation portion.

8. The control method for steer by wire according to claim 7, further comprising comparing a simulated feedback actuator torque obtained by the base SAT portion with an estimated rack force estimated by the rack force estimation portion, and selecting and outputting maximum output as a feedback actuator torque.

9. The control method for steer by wire according to claim 8, further comprising removing, by a dead zone portion, noise included in an estimated rack force estimated by the rack force estimation portion.

10. The control method for steer by wire according to claim 7, further comprising:
- subtracting, by a subtraction portion, an estimated rack force estimated by the rack force estimation portion from a simulated feedback actuator torque obtained by the base SAT portion;
- selecting, by a switch portion, any one of output of the subtraction portion, an estimated rack force estimated by the rack force estimation portion, and a simulated feedback actuator torque obtained by the base SAT portion; and
- determining a feedback actuator torque based on output of the switch portion.

11. The control method for steer by wire according to claim 10, further comprising reducing, by a transition smoothing portion, a steep change in value that occurs when the feedback actuator torque is switched from an estimated rack force estimated by the rack force estimation portion to a simulated feedback actuator torque obtained by the base SAT portion.

12. The control method for steer by wire according to claim 7, further comprising selecting, by a switch portion, any one of an estimated rack force estimated by the rack force estimation portion, a simulated feedback actuator torque obtained by the base SAT portion, and setting of a manual control feedback mode,
- wherein setting of a manual control feedback mode uses an estimated rack force estimated by the rack force estimation portion or a simulated feedback actuator torque obtained by the base SAT portion as a feedback actuator torque.

* * * * *